No. 650,765. Patented May 29, 1900.
G. R. TOMB.
TROLLEY.
(Application filed Oct. 13, 1899.)
(No Model.) 2 Sheets—Sheet 1.
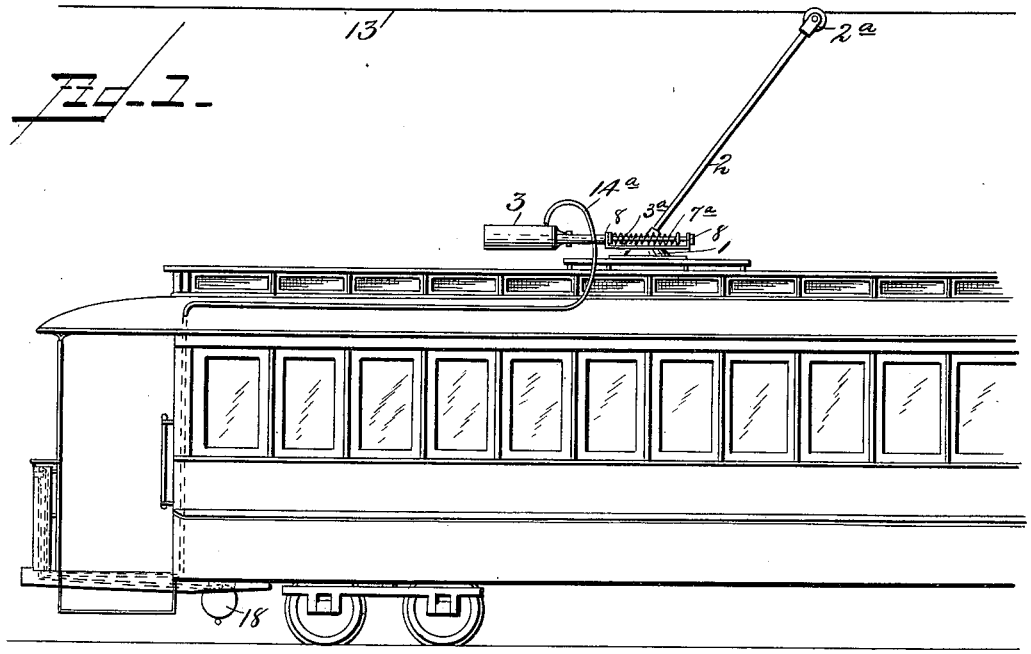
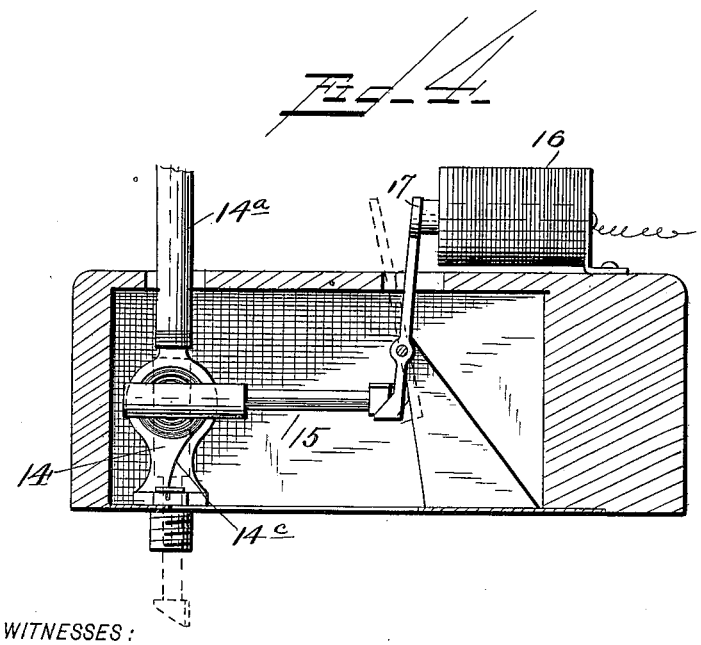
WITNESSES: Franck L. Ourand.
INVENTOR: George R. Tomb.
BY Louis Bagger & Co.,
ATTORNEYS
THE NORRIS PETERS CO., PHOTO-LITHO., WASHINGTON, D. C.

No. 650,765. Patented May 29, 1900.
G. R. TOMB.
TROLLEY.
(Application filed Oct. 13, 1899.)
(No Model.) 2 Sheets—Sheet 2.
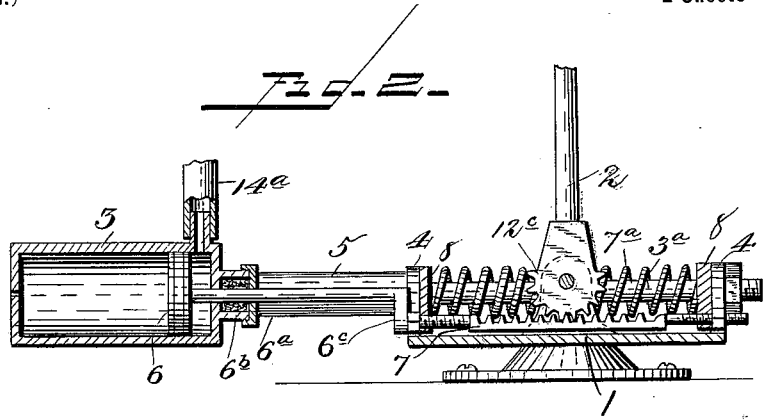
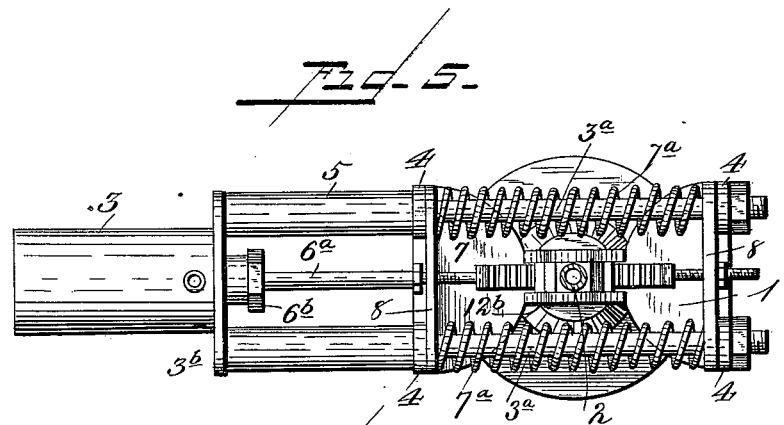
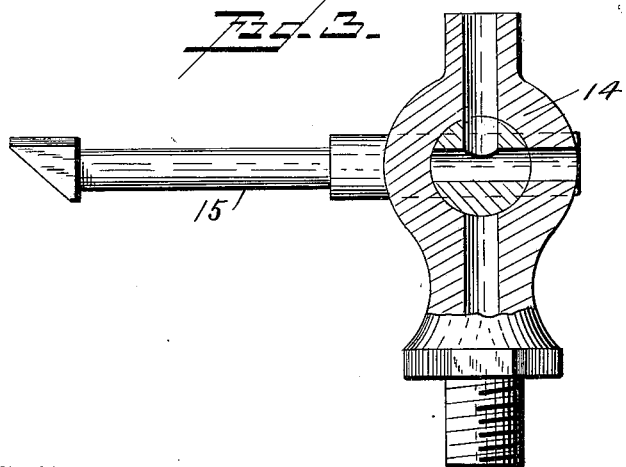
WITNESSES: INVENTOR:
George R. Tomb.
BY
Lewis Bagger & Co.,
ATTORNEYS.

United States Patent Office.

GEORGE R. TOMB, OF LORAIN, OHIO.

TROLLEY.

SPECIFICATION forming part of Letters Patent No. 650,765, dated May 29, 1900.

Application filed October 13, 1899. Serial No. 733,512. (No model.)

*To all whom it may concern:*

Be it known that I, GEORGE R. TOMB, a citizen of the United States, residing at Lorain, in the county of Lorain and State of Ohio, have invented new and useful Improvements in Trolleys, of which the following is a specification.

My invention relates to improvements in trolleys for overhead electric cable-railways, more especially means for the replacement of the trolley in event of derailment.

It has for its object more particularly to prevent possible accident to the span-wires, to the trolley-pole, or to the trolley wire or cable from the swaying or swinging of the trolley in the event of its jumping from said cable, said trolley being adapted in case of derailment to be brought down clear of all wires or cable; also, to permit of the ready replacement of the trolley in such event, as well as to promote convenience and facility of operation; also, to greatly simplify construction and arrangement of the parts and lessen cost of manufacture.

It consists of the sundry combinations of parts, including their construction and arrangement, substantially as hereinafter more fully disclosed, and specifically pointed out by the claims.

In the accompanying drawings, illustrating the preferred embodiment of my invention, Figure 1 is a view disclosing its application. Fig. 2 is a longitudinal section of the parts bearing the trolley and the air-cylinder. Fig. 3 is an enlarged sectional view of the automatic valve adapted to open up communication between the trolley air-cylinder and air-receiver on the car to remove air-pressure from the trolley and permit it to lower a required extent to take it out of the plane of the span and trolley wires or cable. Fig. 4 is a cross-section through certain parts, showing the inside view, more especially the automatic valve, the electromagnets, and the armature-lever to engage the stem of said valve, together with other features. Fig. 5 is a detail plan view of the parts disclosed in Fig. 2.

It will be understood that latitude is allowed herein as to details, as they may be varied or changed according to circumstances without departing from the spirit of my invention and the same yet remain intact and be protected.

In carrying out my invention I suitably support or secure upon the car a turn-table 1, adapted to carry the trolley-pole 2 with its wheel $2^a$, and to said turn-table is also connected an air cylinder or chamber 3 by means of parallel rods $3^a$ $3^a$. These rods are secured at ends to lateral apertured extensions $3^b$ of one head of the cylinder 3 and extended or passed through apertured upturned or right-angled portions 4 at both ends of the turn-table, being nutted in place at their distant ends. These rods have inserted or slipped on them between the lateral extensions $3^b$ of cylinder-head and the nearer upturned portions 4 of the turn-table sleeves 5, which, together with the thus inclosed or sleeved portions of said rods, guard, as it were, the piston-rod $6^a$ and its stuffing-box $6^b$ of the piston 6, arranged in the cylinder 3, presently again referred to.

To a pendent or right-angled end portion $6^c$ of the piston-rod $6^a$ is suitably connected a rack or slide 7, resting upon the turn-table 1. The slide or rack 7 has screw-threaded end portions passed centrally through and nutted to cross-pieces 8, inserted upon the rods $3^a$ and yieldingly held apart by springs $7^a$ $7^a$ and resting against the upturned portions 4 of said turn-table upon their inner sides. These springs are supported upon or encircle the rods $3^a$ and have the effect to centralize the trolley-pole, with its wheel, traveling upon the cable.

The trolley-wheel $2^a$ engages or contacts, as usual, with the wire or cable 13, and its carrying-pole 2 is suitably pivoted between upstanding apertured lugs or ears $12^b$ of the turn-table 1. This pole has its inner or lower end formed with cogs $12^c$, adapted to mesh with the teeth of the rack or slide 7, carried by the turn-table 1, to provide for the manipulation of said pole by the piston of the air-cylinder 3, actuating said rack or slide, as presently seen.

In front of the motorman's station on the car is arranged a three-port valve 14, suitably secured in place and having hose or other swinging tubular connection $14^a$ with the air cylinder or chamber 3, as shown. This valve has coiled around or otherwise applied to its stem a helical or other spring $14^c$ to automatically actuate said valve when released from the armature-lever, and to said stem is fixed a lever 15, arranged at right angles to said stem, presently again referred to. Adjacently to said three-port valve is disposed an electromagnet 16, preferably comprising one or more spools wrapped with fine insulated wire, and, with poles of the same, is adapted to engage or contact a soft-metal armature 17, suitably hung with relation to said magnet and adapted to engage the valve-stem lever 15, and thus hold or retain the valve 14 in its normal position when in circuit. The electromagnet is suitably connected up in circuit by wires with the source of electricity for operating the car through the trolley wheel or contact and cable. The valve casing or chamber has also pipe connection with an air-receiver 18 on the car, and when the valve is in its normal position and the trolley is in working position the valve opens up communication between said air-cylinder of the trolley and the atmosphere, communication with the air-receiver on the car being closed, allowing air in said cylinder to escape. At the instant, however, the trolley leaves the wire or cable the circuit is broken, releasing the armature from the electromagnet, consequently allowing the disengagement of the armature from the valve-stem lever and the spring on said stem to automatically throw valve into such position as to open up communication between the air-receiver on car and the air-cylinder of the trolley, communication with the atmosphere being cut off, thus causing by the action of the piston of said cylinder the immediate lowering of the trolley-pole with its wheel. Thus it will be seen that the trolley-pole will be taken out of the range of the various wires and cable and be prevented from swinging or swaying laterally and striking the same, which would result to the injury or liability of tearing away thereof. By restoring the valve to its former position by again engaging the armature with the magnet the motorman can allow the trolley or pole to be brought into position for replacing.

Having thus fully described my invention, what I claim is—

1. The combination with a trolley and means to actuate the same, of a pressure cylinder or chamber and piston adapted to operate said trolley, an air-receiver, and a differentially-ported valve, an electromagnet controlling said valve, said air-receiver, piston-cylinder and valve being in communication, substantially as set forth.

2. The combination with a trolley and means to actuate the same, of a pressure chamber or cylinder and piston connected with said trolley, an air-receiver, a differentially-ported valve, an electromagnet controlling said valve, said air-receiver, valve, and piston having pipe connection, substantially as set forth.

3. The combination of a trolley, a sliding rack adapted to engage or mesh with a cogged or toothed portion of said trolley, a piston-cylinder, with its piston connection to said rack, an air-receiver, a differentially-ported valve, an electromagnet controlling said valve, and means to effect communication between said piston-cylinder, valve and air-receiver, substantially as set forth.

4. The combination of a trolley, a sliding rack adapted to engage a toothed or cogged portion of said trolley, a three-ported valve whose stem is automatically actuated, an electromagnet whose armature is adapted to engage the arm or lever of said valve-stem, and an air-receiver, said piston-cylinder valve and air-receiver being in communication, substantially as specified.

5. The combination of a trolley, a turn-table bearing a sliding rack adapted to gear with a toothed or cogged portion of said trolley, a piston-cylinder also carried by said turn-table and having its piston connected to said rack, a three-ported valve, an electromagnet controlling said valve, and an air-receiver, said piston-cylinder, valve and air-receiver all in communication, substantially as specified.

6. The combination of a trolley having a toothed or cogged portion, a rack meshing with said toothed or cogged portion of trolley, and a spring arranged on said turn-table to act upon said rack, a differentially-ported valve, an electromagnet controlling said valve, an air-receiver, and pipe or hose connection between said piston-cylinder, valve and air-receiver, substantially as specified.

7. The combination of a trolley having a toothed or cogged portion, a rack in engagement with said toothed or cogged portion of the trolley, a turn-table bearing said trolley and a piston-cylinder whose piston is connected to said rack, said cylinder having rods connected to lateral extensions of one of its heads and extending through upturned perforated portions of said turn-table, and plates bearing against said upturned portions of the turn-table, springs arranged on said rods, between said cross-bars, said rack also being passed through and secured to said cross-plate, a differentially-ported valve, an electromagnet controlling said valve, and an air-receiver, said piston-cylinder, valve and air-receiver having a common means of communication, substantially as set forth.

8. The combination with the pivoted trolley-pole, of the pressure-cylinder, the piston therein, means connecting said piston with the trolley-pole, a pressure-pipe leading to said cylinder having a valve therein, mechanical means for opening said valve, an electromagnet adapted to control the valve-opening mechanism, the circuit of said magnet communicating with the base of the trolley-pole which circuit is adapted to be broken by the trolley leaving the conductor.

9. The combination with the trolley-pole, of the pressure-cylinder, the piston in said cylinder, means connecting said piston with the trolley-pole, the fluid-pressure pipe communicating with said cylinder having a controlling-valve therein, an electric circuit connected with the trolley including means connected with the trolley-pole for opening said valve when the trolley is disengaged from the conductor.

In testimony whereof I have hereunto set my hand in presence of two subscribing witnesses.

GEORGE R. TOMB.

Witnesses:
GEO. E. HALL,
S. H. WILLIAMS.